United States Patent [19]

Richardson

[11] 4,376,182

[45] Mar. 8, 1983

[54] TOUGHENED POLYAMIDE FLAME RETARDED WITH OCTABROMODIPHENYL ETHER

[75] Inventor: Paul N. Richardson, Wilmington, Del.

[73] Assignee: E. I. Du Pont de Nemours and Company, Wilmington, Del.

[21] Appl. No.: 372,560

[22] Filed: Apr. 28, 1982

[51] Int. Cl.³ .............................................. C08K 5/06
[52] U.S. Cl. ................................... 524/371; 524/514
[58] Field of Search .............................. 524/371, 514

[56] References Cited

U.S. PATENT DOCUMENTS

| | | | |
|---|---|---|---|
| 3,472,916 | 10/1969 | Anspon et al. | 525/183 |
| 3,808,171 | 4/1974 | Mohajer | 260/45.75 B |
| 3,816,367 | 6/1974 | Larkin et al. | 260/45.75 B |
| 3,897,389 | 7/1975 | Touval | 260/45.75 B |
| 4,194,072 | 3/1980 | Chang et al. | 260/45.75 B |
| 4,214,103 | 7/1980 | Garman et al. | 260/45.95 G |
| 4,220,733 | 9/1980 | Jones | 524/371 |
| 4,254,242 | 3/1981 | Kyo | 260/45.95 G |
| 4,325,865 | 4/1982 | Baer | 524/514 |

FOREIGN PATENT DOCUMENTS 2243847  3/1974  Fed. Rep. of Germany.

OTHER PUBLICATIONS

Tabor et al.-"Decabromodiphenyl Oxide-A New Fire Retardant Additive for Plastics"-Fire Retardants: Proceedings of 1974 International Symposium on Flammability and Fire Retardants, Technomic Pub. Co. (1974) pp. 162 to 179.

Great Lakes Chemical Corp. Product Information Bulletin dated Mar. 13, 1979: Great Lakes DE-79 TM.

*Primary Examiner*—Veronica P. Hoke

[57] ABSTRACT

Toughened flame retardant polyamide molding blend containing a selected octabromodiphenyl ether and a polymeric toughening agent.

3 Claims, No Drawings

TOUGHENED POLYAMIDE FLAME RETARDED WITH OCTABROMODIPHENYL ETHER

FIELD OF THE INVENTION

This invention relates to toughened polyamide molding resins and more particularly to toughened, flame-retardant polyamide resins.

BACKGROUND OF THE INVENTION

In recent years it has been found that certain materials can be very finely dispersed in polyamide matrices to render the resultant composition "tough". It has been known for many years that ethylene-carboxylic acid copolymers can be dispersed in polyamides to improve toughness by reaction of the acid component of the copolymer with the amine ends of the polyamide chain. However, these materials are only toughened to a modest extent. More recently low modulus materials with reactive sites described in Epstein U.S. Pat. No. 4,174,358 have a toughness an order of magnitude higher than the "base" polyamide resin; and when measured for toughness, break in a ductile rather than brittle fashion. These extra tough resins are highly susceptible to loss of toughness by addition of any "foreign" bodies such as glass fibers for reinforcement, and fire retardants. In fact, whereas glass fibers increase the toughness of simple polyamides by a factor of two, similar glass fibers reduce the toughness of these extra tough materials by a factor of four. Similar considerations apply to additives which are used to make the resins fire retardant, particularly when sufficient additive is used to meet the very stringent requirements to achieve a "V-O" rating in the Underwriters Laboratory Test 94 for fire retardancy.

Thus, even when satisfactory fire retardant additives for polyamides such as those described in Mohajer U.S. Pat. No. 3,808,171 are used they either fail to pass the flammability test or drastically reduce the toughness of the extra tough material.

The Mohajer patent describes a class of halogenated organic flame retardants that allegedly do not degrade or discolor polyamide resins, and therefore do not weaken them, when added to the polyamide resins in the absence of toughening agents. But when toughening agents, especially adducts of an unsaturated compound containing carboxyl groups and a polymer of ethylene and a nonconjugated diene, are added to polyamide resins, the teaching of Mohajer is not applicable. For example, when bis(p-bromo-phenyl)ether (a flame retardant of Mohajer) is added to a blend of a polyamide and such a toughening adduct, the resulting mixture quite surprisingly is not flame retardant. Applicant, however has found that when octabromo diphenyl ether is added to a blend of a polyamide and the adduct, the resulting mixture is both tough and flame retardant.

SUMMARY OF THE INVENTION

This invention provides a toughened, flame-retardant polyamide molding blend consisting essentially of:
  (A) a film-forming polyamide selected from
   (i) poly(hexamethylene adipamide) or,
   (ii) a copolymer of hexamethylene adipamide and caprolactam,
  (B) at least 13% by weight of (A), (B) and (C) of a toughening system containing at least 7% by weight of (A), (B) and (C) of an adduct of (a) an ethylenically unsaturated compound containing carboxyl groups or carboxyl derivatives, and (b) a copolymer of ethylene, at least one $C_3$ to $C_6$ $\alpha$-olefin, and at least one nonconjugated diene, said unsaturated compound being present in the adduct in an amount such that the anhydride functionality is at least 0.05 meq/g of adduct, and 0-8% of a toughening extender and
  C. at least 24% by weight of (A), (B) and (C) of a flame retardant system composed of at least 17% by weight of (A), (B) and (C) of octabromodiphenyl ether and antimony trioxide present in an amount of at least 5.9% by weight of (A), (B) and (C).

DESCRIPTION OF THE INVENTION

The Polyamide

The polyamide resins used in the blends of this invention are well-known in the art and embrace those resins having a molecular weight of at least 15,000.

The polyamides include polyhexamethylene adipamide (66 nylon), and polyamides prepared by the copolymerization of the hexamethylene adipamide and caprolactam.

The Toughening System

The toughening adduct employed in the blend of this invention may be prepared as described in Flexman U.S. Pat. No. 4,026,067 or Caywood U.S. Pat. Nos. 3,884,882 and 4,010,223.

(a) The Copolymer Component of the Adduct

The copolymer component is an elastomeric polymer of ethylene, at least one $C_3$ to $C_6$ $\alpha$-olefin, and at least one nonconjugated diene. These polymers have a substantially saturated hydrocarbon backbone chain and have side-chain unsaturation. The polymers are conveniently prepared by polymerizing the monomers in the presence of a coordination catalyst system such as diisobutylaluminum chloride and vanadium oxytrichloride. Polymerization may be conducted in an inert solvent or in a slurry or particle form. Details of their preparation are given, for example, in U.S. Pat. Nos. 2,933,480; 2,962,451; 3,000,866; 3,093,620; 3,093,621; 3,063,973; 3,147,230; 3,154,528; 3,260,708; and in M. Sittig, "Stereo Rubber and Other Elastomer Processes," Noyes Development Corporation, Park Ridge, N.J. 1967.

Propylene is normally selected as the $C_3$–$C_6$ $\alpha$-olefin in preparing such polymers. Other $C_3$–$C_6$ $\alpha$-olefins, namely 1-butene, 1-pentene, and 1-hexene can be selected in place of or in addition to propylene in preparing the elastomeric polymers.

Preferably the nonconjugated diene is monoreactive. Monoreactive nonconjugated dienes have one double bond which readily enters the polymerization reaction with ethylene and propylene, and a second double bond which does not, to any appreciable extent, enter the polymerization reaction. The nonconjugated diene imparts side chain unsaturation, which unsaturation is available for adduct formation.

Monoreactive nonconjugated dienes include linear aliphatic dienes of at least six carbon atoms which have one terminal double bond and one internal double bond, and cyclic dienes wherein one or both of the carbon-to-carbon double bonds are part of a carbocyclic ring. Of these dienes, 1,4-hexadiene is preferred.

Cyclic dienes are also useful and include alkylidene bicycloalkenes, alkenyl bicycloalkenes, bicycloalkadienes, and alkenyl cycloalkenes. Representative of alkylidene bicyloalkenes are 5-alkylidene-2-norbornenes such as 5-ethylidene-2-norbornene and 5-methylene-2-2-norbornene. Representative of alkenyl bicycloalkenes are 5-alkenyl-2-norbornenes such as 5-(1'-propenyl)-2-norbornene, 5-(2'-butenyl)-norbornene, and 5-hexenyl-2-norbornene. Dicyclopentadiene and 5-ethyl-2,5-norbornadiene are illustrative of bicycloalkadienes, and vinyl cyclohexene is representative of alkenyl cycloalkenes which may be selected as the diene monomer. Polymers prepared from cyclic dienes preferably have an inherent viscosity within the range of about 1.5 to 3.0, as measured on 0.1 gram polymer dissolved in 100 milliliters of perchloroethylene at 30° C., for optimum processing properties.

The nonconjugated diene can also be a direactive one. By "direactive" is meant that both double bonds are capable of polymerizing during preparation of the polymer. Polymers of this class preferably have an inherent viscosity of about 1.2 to 3.0, as measured on 0.1 gram polymer dissolved in 100 milliliters of perchloroethylene at 30° C., for optimum processing properties. Preferred polymers include a class of tetrapolymers made from ethylene, at least one $C_3$ to $C_6$ α-monoolefin, at least one monoreactive nonconjugated diene, and at least one direactive nonconjugated diene such as 2,5-norbornadiene or 1,7-octadiene. A preferred polymer of this class is a tetrapolymer of ethylene, propylene, 1,4-hexadiene, and 2,5-norbornadiene.

(b) The carboxyl-containing component of the adduct

The ethylenically unsaturated compounds containing carboxyl groups or carboxyl derivatives are preferably unsaturated compounds taken from the class consisting of α,β-ethylenically unsaturated carboxylic acids having from 3 to 8 carbon atoms, and derivatives thereof taken from the class consisting of monoesters of alcohols of 1 to 29 carbon atoms and the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers. Illustrative of such compounds are maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoethyl ester, monoesters of maleic, fumaric, itaconic acids with R where R is up to 29 carbon atoms, e.g., methyl, propyl, isopropyl, butyl, isobutyl, hexyl, cyclohexyl, octyl, 2-ethyl hexyl, decyl, stearyl, methoxy ethyl, ethoxy ethyl, hydroxy ethyl, etc. Thus these compounds provide pendant carboxyl or anhydride groups to the polymer.

(c) Preparation of the Adduct

The adducts can be prepared by any grafting process which intimately mixes the ethylenically unsaturated compound with the polymer without appreciable generation of free radicals, and which concurrently or subsequently heats the mixture to a temperature whereat thermal addition occurs. Selected temperatures will generally be at least 225° C. to obtain adduct formation at acceptable rates and less than about 350° C. to avoid any significant polymer breakdown. Preferred temperature ranges will vary with the particular polymer and can readily be determined by one skilled in the art. Mixing of the compound and polymer can be by blending in an internal mixer or extruder, or by blending finely divided dry compound with polymer on a well-ventilated rubber mill with concurrent or subsequent heating, such as in a hot press or mold. Temperatures employed are those sufficiently high enough to achieve thermal grafting. The compound can be substituted with groups, such as bromine or chlorine, which do not unduly interfere with the graft reaction.

Care must be exercised in selecting mixing conditions for polymers derived from strained ring dienes such as ethylidene norbornene. Such polymers will readily generate free radicals when sheared at low temperatures, and are preferably mixed with monomer at high temperature, such as above 90° C. to avoid appreciable gel formation.

It is generally desired to form adducts containing about 0.5 to 9 percent, and preferably about 1 to 5 percent, by weight ethylenically unsaturated compound. The acid or anhydride functionality of the adduct will be at least 0.05 meq/g and preferably will be at least 0.1 meq/g.

(d) Amount of Toughener

The toughener will be present in amount of at least 7% to provide a toughening effect measured by Izod impact resistance. An upper limit on the toughener is not critical and is dictated by practicality. Above about 20% or so the toughening effect provided by the toughener generally begins to decrease. A toughener extender can be employed, if desired, in an amount up to about 8%. This extender acts to some extent as a toughener and can be used to lessen the amount of the toughener used in the blend. The extender can be any hydrocarbon polymer such as polyethylene or, preferably, the copolymer used to prepare the adduct described above. The amount of the toughener and the toughener extender must be at least 13%, as heretofore stated.

The Flame-Retardant System

The flame retardant is a mixture of brominated diphenyl ethers that is predominately composed of octabromodiphenyl ether and septabromodiphenyl ether. The term "octabromodiphenyl ether" as used herein means either octabromodiphenyl ether or said mixture.

The antimony trioxide is employed as a synergist to enhance the flame-retardant properties.

The flame retardant system will be present in an amount of at least 24% by weight. An upper limit on the amount is not critical, but above about 30% the amount tends to detract from the strength of the blend. Preferably the brominated additive will be present in an amount of 19-23%. The antimony trioxide will be usually present in an amount of between 5.9-7.5%.

Other Additives

The blends of this invention may contain additives commonly employed with polyamide resins, such as dyes, pigments or other colorants, antioxidants, nucleating agents, ultraviolet light and heat stabilizers, lubricants and the like.

Preparation of Blends

To prepare the blends of this invention, the ingredients are simply mixed by any usual means and melt compounded. Werner-Pfleiderer twin screw, or the like, are common useful extruders that can be employed to melt compound the blends. Ordinarily, the ingredients are dry blended and then extruded at a temperature above the melting point of the polyamide. Care must be taken not to prematurely melt the flame retardant because this stops the screws from conveying the blend forward. Such care is usually taken by operating the rear of the extruder below the melting point of the flame retardant. Rather than compounding in a single step a blend of nylon, toughener and extender can be melt compounded in a first step, and flame retardant and synergist can be added in a second compounding step.

EXAMPLES

Ingredients Employed

A partial list of ingredients employed follows. (Other ingredients used are listed in footnotes to the tables appearing further below):

Polyamides employed were: nylon 66, relative viscosity of 40 and 52: nylon 66/6 copolymer (90/10 wt. %), relative viscosity 40 and 52.

Toughening agent employed was: an adduct of fumaric acid and a copolymer of ethylene, propylene, 1-4 hexadiene and 2,5 norbornadiene.

Flame retardants employed included: Octabromo diphenyl ether—a mixture of brominated diphenyl ethers within the scope of this invention—mol wt about 800, 79% bromine, m.p. range 70°-150° C.

(c) Art Flame Retardant A

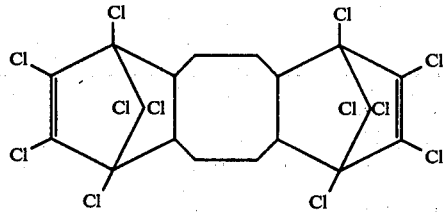

(d) Art Flame Retardant B

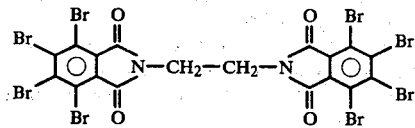

EPDM means a polymer made from ethylene, propylene, and diene monomers. It is a toughening extender.

Extrusion Compounding

The blends were made by physically mixing the ingredients, and feeding the dry mixture to a Werner-Pfleiderer twin-screw extruder. The extruder was equipped with screws designed to give good mixing. Extrusion conditions for compounding blends containing brominated diphenyl ether require careful control. The feed throat is water cooled and the rear barrel section is operated at about 100° C. These requirements are brought about by the low melting temperature of the brominated diphenyl ether. If it melts before it is conveyed into the barrel by the screws, feeding of the extruder stops.

Adaptors and dies of the extruder system are streamlined to prevent thermal decomposition of the melt.

Compositions containing the other flame retardants were extruded in the same equipment but they did not require the same "cold" rear barrel zone. The other flame retardants have high melting points.

Molding

Test bars were molded using a screw injection machine and a melt temperature of about 280° C.

Izod Impact Test

Izod impact tests were carried out on specimens cut from injection molded ⅛ inch thick test bars in accordance with the ASTM D256 procedure. Specimens were stored in glass jars until tested to keep them dry.

Flammability Test

Flammability was evaluated by the "Vertical Burning Test for Classifying Materials" as described in the Underwriters Laboratories, Inc. publication.

UL94-Test for Flammability of Plastics Materials

Specimens were injection molded test bars and in most cases were 1/16 inch thick. In accordance with the procedure, they were conditioned for 48 hours at 50% RH. Standard criteria were used to judge if a material passed this part of the test to be rated V-O.

EXAMPLE 1 AND COMPARISONS

A series of blends were made from the nylon 66/6 copolymer containing toughener, flame retardant and antimony oxide. They were compounded, molded, and tested according to procedures described above.

In Comparisons A and B, compositions like those of the Mohajer patent (U.S. Pat. No. 3,808,171) were used except that they also contained the toughening adduct. In Comparison C, a composition of Mohajer was used that was identical to Comparison A except that the amount of flame retardant used was like that used by applicant.

Specifically the compositions were as follows:

Comparison A 72.5% Polyamide, relative viscosity (RV 40)
16.5% toughening adduct
5.9% antimony oxide
5% 4,4'-dibromodiphenyl ether

Comparison B 72.5% polyamide (RV-40)
16.6% toughening adduct
5.9% antimony oxide
5% octabromodiphenyl ether

Comparison C 58.3% Polyamide (RV-40)
13.3% toughening adduct
5.9% antimony oxide
22.5% 4,4'-dibromodiphenyl ether

Example 1

58.3% polyamide (RV-40)
13.3% toughening adduct
5.9% antimony oxide
22.5% octabromo diphenyl ether
Test results are as follows:

TABLE 1

| Composition | Tensile Strength psi | Elongation % | Izod Impact Strength ft lb/in | UL94 (1/16") burn time | Rating |
|---|---|---|---|---|---|
| A | 6300 | 173 | 21 | 551 | Failed |
| B | 6800 | 58 | 20.5 | 186 | Failed |
| C | 5200 | 196 | 19.5 | 532 | Failed |
| 1 | 6100 | 53 | 16.5 | 10 | VO |

It is seen that Comparison A which uses 4,4'-dibromo diphenyl ether second in the list at column 2, line 34 et seq of Mohajer fails the UL flame retardant test; and that Comparison B which uses octabromo diphenyl ether, a compound within the scope of Mohajer's flame retardants used at Mohajer's amount, also failed at the concentration used. It is seen that Comparison C, which uses 4,4'-dibromo diphenyl ether in amounts recited in applicants invention, failed the UL flame retardancy test.

In contrast, the composition of Example 1 has good flame retardancy.

EXAMPLE 2 AND COMPARISONS

A series of blends were made from the nylon 66/6 copolymer containing toughener, flame retardant and antimony oxide, and toughener extender. They were compounded, molded and tested according to procedures described above.

The blends made were as follows:

TABLE 2

| Sample | 90/10[3] Nylon 66/6 Copolymer % | Adduct Toughener % | EPDM % | Antimony[1] Oxide Concentrate % | Flame Retardant |
|---|---|---|---|---|---|
| Comparison E | 59 | 7.3 | 6.7 | 7[2] | Art Flame Retardant A (20%) |
| Comparison F | 62.9 | 7.8 | 5.3 | 8 | Decabromodiphenyl (20%) Ether 16 |
| Comparison G | 60.7 | 7.5 | 4.8 | 9 | Art Flame Retardant B (18%) |
| Example 2 | 59.2 | 7 | 6.3 | 7.8 | Octabromodiphenyl Ether (19.6%) |

[1]80% $Sb_2O_3$ in polyethylene
[2]added as powder
[3](RV-52)

Results were as follows:

TABLE 2A

| Sample | Izod Impact Strength (DAM) Ft-Lb/In. | Flammability UL94 Rating |
|---|---|---|
| Comparison E | 2.5 | Fails |
| Comparison F | 2.1 | V-0 |
| Comparison G | 1.3 | V-0 |
| Example 2 | 19 | V-0 |

It is seen that the flame retardants used in Comparisons E, F and G adversely affected the toughening properties of the composition.

EXAMPLE 3 AND COMPARISONS

Blends similar to those in Example 2 were made except that the polyamide employed was nylon 66 instead of a copolymer of nylon 66/6.

Compositions and results are shown in tables 3 and 3A.

TABLE 3

| Sample | Nylon[1] 66 % | Adduct Toughener % | EPDM % | 80% Antimony Oxide Concentrate in Polyethylene % | Flame Retardant |
|---|---|---|---|---|---|
| Comparison H | 58.4 | 7.2 | 6.6 | 8.2 | Art Flame Retardant A (19.7%) |
| Comparison I | 62.9 | 7.8 | 5.3 | 8 | Decabromodiphenyl Ether (16%) |
| Comparison J | 60.7 | 7.5 | 4.8 | 9 | Art Flame Retardant B (18%) |
| Example 3 | 59.2 | 7 | 6.3 | 5.9 | Octabromodiphenyl Ether (21.5%) |

[1](RV-52)

TABLE 3A

| Sample | Izod Impact Strength (DAM) Ft-Lb/In. | Flammability UL94 Rating |
|---|---|---|
| Comparison H | 1.05 | Fails |
| Comparison I | .25 | V-1 |
| Comparison J | .2 | V-1 |
| Example 3 | 12 | V-0 |

It is seen that the flame retardants used in Comparisons H, I and J adversely affected toughening properties.

I claim:
1. A toughened, flame-retardant polyamide molding blend consisting essentially of:
   (A) a film-forming polyamide selected from
   (i) poly(hexamethylene adipamide) or,
   (ii) a copolymer of hexamethylene adipamide and caprolactam.
   (B) at least 13% by weight of (A), (B) and (C) of a toughening system containing at least 7% by weight of (A), (B) and (C) of an adduct of (a) an ethylenically unsaturated compound containing carboxyl groups or carboxyl derivatives, and (b) a copolymer of ethylene, at least one $C_3$ to $C_6$ α-olefin, and at least one nonconjugated diene, said unsaturated compound being present in the adduct in an amount such that the anhydride functionality is at least 0.05 meq/g of adduct, and 0–8% of (A), (B) and (C) of a toughening extender; and
   (C) at least 24% by weight of (A), (B) and (C) of a flame retardant system composed of
   (i) at least 17% by weight of (A), (B) and (C) of octabromodiphenyl ether, and
   (ii) antimony trioxide present in an amount of at least 5.9% by weight of (A), (B) and (C).

2. The polyamide molding blend of claim 1 wherein the polyamide is a copolymer of hexamethylene adipamide and caprolactam.

3. The polyamide molding blend of claim 1 wherein the polyamide is poly(hexamethylene adipamide).

* * * * *